US008972967B2

(12) United States Patent
Sannidhanam et al.

(10) Patent No.: US 8,972,967 B2
(45) Date of Patent: Mar. 3, 2015

(54) APPLICATION PACKAGES USING BLOCK MAPS

(75) Inventors: Hemchander Venkateshwara Sannidhanam, Bothell, WA (US); John Michael Sheehan, Sammamish, WA (US); Jason Ghssane Salameh, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 13/230,358

(22) Filed: Sep. 12, 2011

(65) Prior Publication Data

US 2013/0067449 A1 Mar. 14, 2013

(51) Int. Cl.
G06F 9/44 (2006.01)
G06F 9/445 (2006.01)
(52) U.S. Cl.
CPC .................................... *G06F 8/60* (2013.01)
USPC ......................................................... 717/170
(58) Field of Classification Search
CPC .............................................. G06F 8/65–8/68
USPC ......................................................... 717/170
See application file for complete search history.

(56) References Cited

U.S. PATENT DOCUMENTS

| 5,933,104 | A | 8/1999 | Kimura |
| 6,105,072 | A | 8/2000 | Fischer |
| 6,353,887 | B1 | 3/2002 | Cotugno |
| 6,587,915 | B1 * | 7/2003 | Kim .............................. 711/103 |
| 6,629,150 | B1 | 9/2003 | Huded |
| 6,650,261 | B2 | 11/2003 | Nelson et al. |
| 6,700,513 | B2 | 3/2004 | McGuire |
| 6,819,627 | B2 | 11/2004 | Obermaier et al. |
| 7,065,650 | B2 | 6/2006 | Collins et al. |
| 7,131,144 | B2 | 10/2006 | Rabin |
| 7,162,499 | B2 | 1/2007 | Lees et al. |
| 7,383,205 | B1 | 6/2008 | Peinado et al. |
| 7,395,150 | B2 * | 7/2008 | Ohira et al. .................... 701/450 |
| 7,490,006 | B2 * | 2/2009 | Sekine et al. .................. 701/532 |

(Continued)

OTHER PUBLICATIONS

Chen et al. "Virtual Disk Image Reclamation for Software Updates in Virtual Machine Environments", 2009, IEEE.*
Suzaki et al. "OS Circular: Internet Client for Reference", 2007, Large Installation System Administration Conference.*
Robert; et al., "New Algorithms for Random Access Text Compression"—Published Date: Apr. 24, 2006 http://ieeexplore.ieee.org/xpls/abs_all.jsp?arnumber=1611578.

(Continued)

*Primary Examiner* — Wei Zhen
*Assistant Examiner* — Junchun Wu
(74) *Attorney, Agent, or Firm* — Timothy Churna; Kate Drakos; Micky Minhas

(57) ABSTRACT

Deploying applications to a device often involves generating an application package for installing the application anew, and application patches for updating the application from a specific first version to a specific second version. Presented herein are alternative techniques for deploying the application to devices using a block map indicating hashcodes for respective blocks of respective resources of the application. A device may install the application by installing the application package, or may update a deployed application from an earlier version to a later version by retrieving the block map, identifying updated blocks having a different hashcode than the current hashcode of the block in the currently deployed application, and retrieving only the updated blocks. The block map also enables concurrent deployment of multiple application versions, and resource sharing among deployed versions and variants by sharing commonly used blocks and retaining alternatives of blocks differing between such versions and variants.

20 Claims, 7 Drawing Sheets

(56) References Cited

U.S. PATENT DOCUMENTS

| | | | |
|---|---|---|---|
| 7,509,354 B2 | 3/2009 | McGarvey | |
| 7,519,736 B2 | 4/2009 | Parham | |
| 7,574,744 B2 | 8/2009 | Eagle et al. | |
| 7,603,391 B1 | 10/2009 | Federwisch et al. | |
| 7,603,587 B2 * | 10/2009 | Rudelic | 714/37 |
| 7,711,958 B2 | 5/2010 | Carro | |
| 7,814,499 B2 | 10/2010 | Straube et al. | |
| 7,925,749 B1 | 4/2011 | Lin et al. | |
| 7,933,924 B2 | 4/2011 | Karlsson et al. | |
| 8,660,787 B2 * | 2/2014 | Minami | 701/400 |
| 2001/0038642 A1 | 11/2001 | Alvarez, II et al. | |
| 2003/0066065 A1 * | 4/2003 | Larkin | 717/177 |
| 2003/0221105 A1 | 11/2003 | Bajaj | |
| 2004/0181790 A1 * | 9/2004 | Herrick | 717/168 |
| 2005/0041955 A1 | 2/2005 | Beuque | |
| 2005/0050332 A1 | 3/2005 | Serret-Avila et al. | |
| 2005/0097113 A1 | 5/2005 | Peterson | |
| 2006/0106996 A1 * | 5/2006 | Ahmad et al. | 711/150 |
| 2006/0117307 A1 | 6/2006 | Averbuch et al. | |
| 2006/0117312 A1 * | 6/2006 | Seo | 717/168 |
| 2006/0122771 A1 * | 6/2006 | Mikuriya et al. | 701/210 |
| 2006/0136365 A1 | 6/2006 | Kedem et al. | |
| 2007/0050431 A1 | 3/2007 | Vaidya et al. | |
| 2007/0220261 A1 | 9/2007 | Farrugia et al. | |
| 2007/0240147 A1 | 10/2007 | Bernabeu-Auban et al. | |
| 2007/0244636 A1 * | 10/2007 | Horikami | 701/208 |
| 2008/0133928 A1 | 6/2008 | Torrubia et al. | |
| 2008/0208451 A1 * | 8/2008 | Minami | 701/201 |
| 2008/0229111 A1 | 9/2008 | Paya | |
| 2009/0106549 A1 | 4/2009 | Mohamed | |
| 2009/0144826 A2 * | 6/2009 | Piccard | 726/24 |
| 2009/0271779 A1 * | 10/2009 | Clark | 717/171 |
| 2010/0017424 A1 | 1/2010 | Hughes | |
| 2011/0029492 A1 | 2/2011 | Vella | |
| 2011/0072421 A1 * | 3/2011 | Parry et al. | 717/168 |
| 2011/0307648 A1 * | 12/2011 | Nomura | 711/103 |
| 2011/0314463 A1 * | 12/2011 | Charters et al. | 717/170 |
| 2012/0110564 A1 * | 5/2012 | Ran et al. | 717/173 |

OTHER PUBLICATIONS

Adiego; et al., "Lempel-Ziv compression of structured text "—Published Date: Aug. 24, 2004 http://ieeexplore.ieee.org/xpls/abs_all.jsp?arnumber=1611578.

Yiannis; et al., "Compression Techniques for Fast External Sorting"—Published Date: 2007 http://www.seg.rmit.edu.au/research/download.php?manuscript=175.

"Multi-part gzip file random access (in Java)"—Published Date: Aug. 4, 2009 http://www.developerit.com/2010/06/03/multi-part-gzip-file-random-access-(in-java).

Gailly; et al., "zlib 1.2.5 Manual"—Published Date: Apr. 19, 2010 http://www.zlib.net/manual.html.

Augeri, et al., "An Analysis of XML Binary Formats and Compression", Retrieved at <<http://www.cs.huji.ac.il/~feit/exp/expcs07/papers/150.pdf>>, Experimental computer science, Jun. 13-14, 2007, pp. 1-11.

Brisaboa, et al., "A compressed self-indexed representation of XML documents", Retrieved at <<http://www.dcc.uchile.cl/~gnavarro/ps/ecdl09.pdf>>, Proceedings of 13th European conference on Research and advanced technology for digital libraries, 2009, pp. 273-284.

Shi; et al., "eSign: An Enterprise Portal for Secure Document Management"—Published Date: Aug. 15-17, 2005 Proceedings: Information Reuse and Integration, Conf, 2005, pp. 481-486 http://ieeexplore.ieee.org/stamp/stamp.jsp?tp=&arnumber=1506520.

Fu, Kevin E., "Integrity and Access Control in Untrusted Content Distribution Networks", Retrieved at <<http://pdos.csail.mit.edu/papers/fu-phd-thesis.pdf>>, Sep. 6, 2005, pp. 1-143.

"ECMA 376-2: Open Packaging Conventions, section 12 Digital Signatures", Retrieved at <<http://www.ecma-international.org/publications/files/ECMA-ST/Office Open XML 1st edition Part 2 (PDF).zip>>, Open Packaging Conventions, Dec. 2006, pp. 1-124.

"ZIP File Format Specification", Retrieved at <<http://www.pkware.com/documents/casestudies/APPNOTE.TXT>>, Retrieved Date: Jun. 21, 2011, pp. 1-45.

* cited by examiner

APPLICATION PACKAGES USING BLOCK MAPS

BACKGROUND

Within the field of computing, many scenarios involve the deployment of an application to one or more devices. The application may be packaged in various ways (e.g., as one or more objects, as a compressed archive, or as an installer package); may be retrieved by the device and/or pushed to the device by an application server; and may involve additional installation measures beyond retrieving the application, such as compiling the application, installing other resources on which the application depends, associating the application with other components of the computing environment of the device, and registering the application with the computing environment of the device. The application may also exist as a set of applications versions representing an ongoing development and refinement of the application, and/or as a set of application variants representing options for a variable aspect, such as the type or platform of the device, the architecture of the application (e.g., a 32-bit application vs. a 64-bit application), and the language or geographic region of the user. The application server may also participate in the deployment of the application to various extents (e.g., simply operating as a file server that provides the application package upon request, or assisting in the selection and provision of a correct application version and/or application variant for the device).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

An application may exist in many application versions and/or application variants. For example, an application may have been continuously updated through dozens or hundreds of versions; may be available for a wide variety of devices and architectures; and may be provided in a large number of languages. These degrees of variation may complicate the deployment of the application. As a first example, in order to upgrade a deployment of an application from a first version to a second version, a designer may compile an application package that installs the application anew on a device, and also an application patch, such as an executable that is configured to modify the application deployment on a device from a particular application version to a particular later application version. The application patch is often generated and provided as a completely separate object from the application package, and the application server may store multiple application packages, each configured to update a deployed application from a current application version to a later application version. Additionally, the designer may provide different application packages for particular application variants (e.g., a first application package for an English-language application variant, and a second application package for a Spanish-language application variant). As a result, the application server may store a large number of application packages and/or application patches for a particular application, and a device and/or user of the device may have difficulty selecting among the large number of options for installing and/or updating the application. While more sophisticated embodiments may involve the participation of the server in choosing and providing a correct application package and/or application patch, such sophistications may involve considerable complexity and additional configuration of the application server. Additionally, in many such scenarios, updating an application resource of an earlier version of an application often involves obtaining a later version of the application resource and overwriting the earlier application version of the application resource. However, this overwriting may involve retrieving the entire application resource, which may be inefficient if the application resource is large and if the updated portion of the application resource is small. Moreover, if the updating of an application involves a large number of changes, it may be inefficient to provide or utilize a patch that applies the extensive updates to the deployed application; rather, the device may download the entire application package, completely uninstall the earlier application version of the application and install the later application version anew.

Presented herein are techniques for deploying an application package from an application server to a set of devices. In accordance with these techniques, the application package may include a block map that, for respective application resources of the application, identifies a hashcode of respective blocks of the application resource. In order to install the application, a device may simply retrieve the application package and store the blocks comprising the application resources. Moreover, in order to update the application, the device may obtain the block map, compare the hashcodes of the blocks of the application resources comprising the application with the hashcodes of the blocks indicated by the block map, identify different hashcodes indicating updated blocks of the application resources of the application, and retrieve and store the updated blocks.

These techniques for deploying an application to a device may present several advantages. As a first example, a single application package may be used to deploy the application anew or to update any version of the application. As a second example, the use of a block map for identifying the changes between a deployed application version of an application and an updated application version of the application is comparatively simple and efficient, and may be performed by the device without significant assistance from the application server. As a third example, the updating of an application may involve only retrieving, updating, and storing only the updated blocks of respective application resources, rather than an entire application resource where only a small portion of the application resource has been changed. As a fourth example, versioning of the application may be achieved by storing the blocks of the application resources that differ between two application versions, and by stitching together the blocks comprising the application resources of the desired application version upon request. This manner of versioning may be performed automatically, without the assistance of a developer in determining which resources to keep, and reduces the consumption of storage and other resources on the device through data de-duplication and sharing. These and other advantages may be achieved through the deployment and usage of an application package comprising a block map in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent

DETAILED DESCRIPTION

Figure 1:
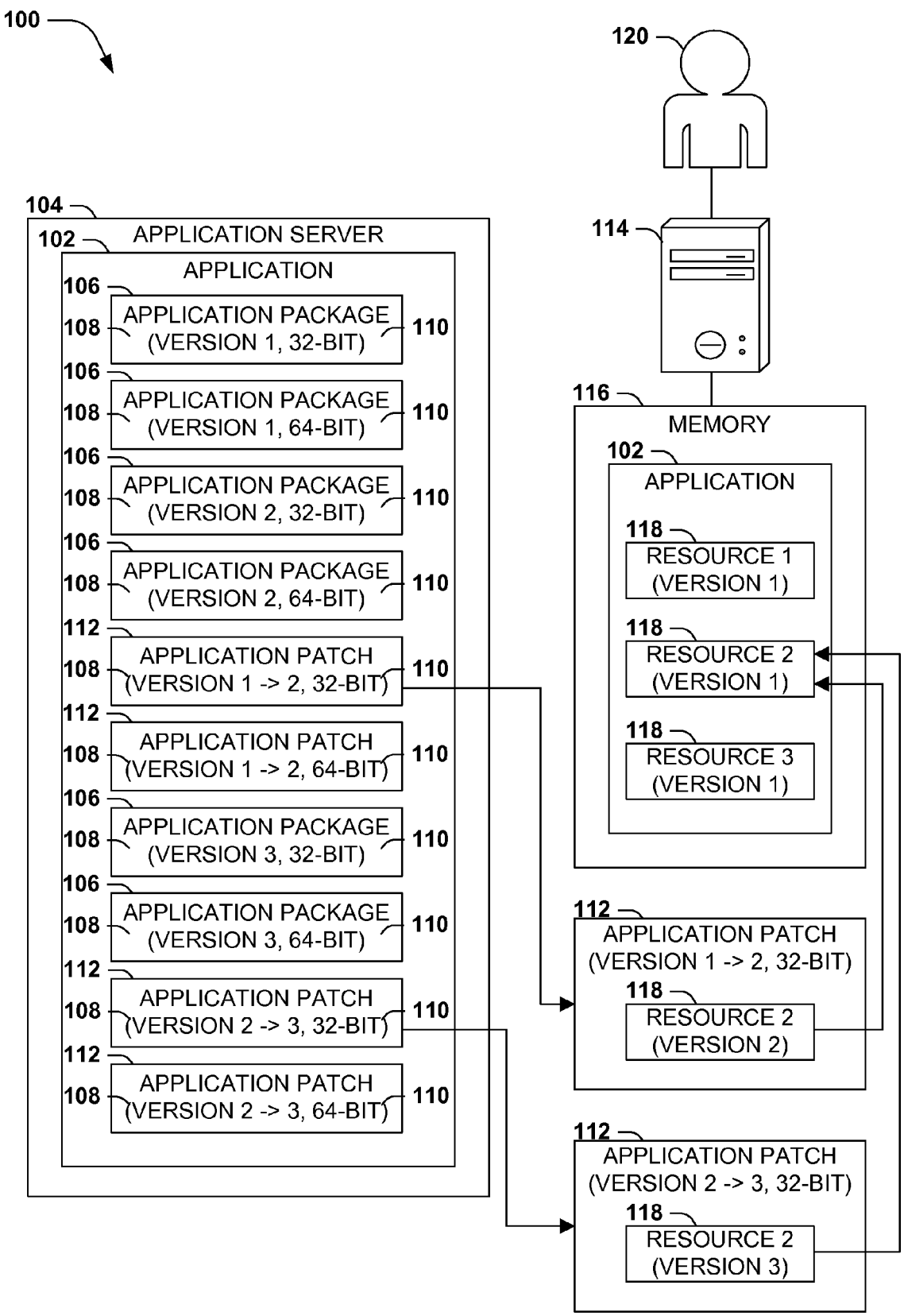
FIG. 1 is an illustration of an exemplary scenario featuring a deployment of an application package to a device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve the deployment of applications from an application server to an application device. The application may include a set of application resources, such as one or more executable binaries, scripts, or compilable source code objects; code libraries; data containers, such as databases, storing information used by the application; metadata defining a default or personalized configuration of the application; and media objects utilized in the application, such as images, icons, video and audio recordings, and help documentation. The application resources may also be organized in many ways, such as a single application resource; a collection of files or objects deployed to and stored in one or more locations of a device; or a container of multiple application resources that provides features such as compression and checksumming of the application resources.

In order to deploy an application to a device, a developer of the application often generates an application package comprising at least some of the application resources and instructions (human-readable and/or machine-executable) for using the contents of the application package to install the application on the device. For example, the application package may simply contain a collection of the application resources that the user of the device may extract and invoke to execute the application. Alternatively, the application package may comprise an automated installer that is configured to, when the application package is deployed to a device and executed by a user, extract the application resources stored in the application package, deploy the application resources to suitable locations within a storage system of the device (e.g., a file system), and register the application with the operating environment of the device, thereby providing an invokable application for the user. Still further variations of the application package may include source code objects that may be compiled on the device to generate the application resources (which may result in an application specifically compiled to use the particular architecture and resources of the device), and, optionally, scripts and/or instructions that the user may read and/or execute to perform the compilation of the source code objects on the device.

Moreover, a developer may update an application to fix logical flaws, improve the performance of the application, provide additional features, or adapt the application to new devices or architectures, thereby resulting in an updated version of the application. The updated application version may be deployed to a device in several ways. As a first example, the developer may generate a new application package for the updated application version, and a device may update a deployed application to the updated application version by obtaining the application package, completely removing the earlier application version of the application from the device, and invoking the application package of the updated application version. However, this technique may involve an interruption of the availability of the application to the users of the device while updating the application, the loss of particular adaptations of the earlier application version for the device and/or the users of the device, and an inefficiency in having to obtain and deploy the entire application package of the updated application version when only a small portion of the application package may have changed (and particularly if the application package is large, such that obtaining the entire application package over a network may be protracted and/or may unhelpfully consume network bandwidth). Therefore, the developer of an application may, upon generating the updated version of the application, also generate an application patch that is configured to alter an earlier application version to the updated application version. For example, a development tool used by the developer to generate the application may automatically identify differences between the earlier version of an application and the updated version and generate instructions to alter a deployment of the earlier application version to the updated version. A user of a device having a deployment of an earlier application version may therefore update the application to the updated version by obtaining and invoking the application patch. The application patch may be comparatively small (e.g., specifying only the changes to the application between a specific earlier version and the updated version), and may be efficiently applied to the device to achieve the updating of the application.

Moreover, applications may exist in a variety of variants. As a first example, an application may be executed by a variety of devices, operating environments, and/or platforms. When an application version is generated, separate application packages may be generated for each device, operating environment, and/or platform, and a user may select the appropriate application package of an application version of the application that is suitable for a particular device. As a second example, an application version of an application may include several feature variants, each of which may be executable on the same device, operating environment, and/or platform, but may execute in a different manner and/or may provide a different set of features. For example, an application may present a native variant that executes natively on a device, and a browser variant that executes within a web browser of the device; an interactive variant that presents a robust user interface for detailed interaction with a user, and an automated variant that executes in an automated manner; and a basic variant that presents basic functionality of the application, and an extended variant that presents extensive functionality (though consuming a greater share of computing resources of the device). As a third example, variants of an application may be targeted to different cultures, nations, and/or geographic regions (e.g., communicating with a user through different languages; cultural standards, such as a cultural manner of formatting text or numbers; and/or with functionality conforming to the laws of a particular nation). Thus, many variants may exist for a particular application version of the application, and each variant may be encapsulated as a different application package (and/or as a patch from an earlier version of the application variant to a later version of the application variant). A user seeking to deploy the application to a device may be presented with the set of options for variants of the application, may select a particular variant, and may obtain and execute on the device the application package or patch for the selected variant of the application version of the application.

However, these examples may evidence the potential complexity involved in deploying a particular variant of a particular version of an application to a particular device, on which the same or a different application version and/or the same or a different application variant may have previously been deployed. Therefore, upon generating a new application version and/or application variant, in order to satisfy the entire user base and device set on which an application may be deployed, a developer may have to generate a potentially large number of application packages and application patches, each specially configured to convert a particular device from an initial deployment state to a target deployment state. This large number of application packages may scale out of control, and perhaps prohibitively so, in exponential proportion with the growing number of application versions and variants. Additional complexity in the deployment of the application may be caused, e.g., by an availability of multiple version types (e.g., major version updates, minor version updates, and development or testing versions of the application); by resource sharing and dependencies; and an interest of one or more users of a device to install and concurrently present multiple versions and/or variants of the application. Such complexities may rapidly scale out of reasonable control.

Some options may be available for managing the complexity of application deployment. As a first example, the developer may choose to limit the number and types of options for deploying an application to a device. As a first example, application patches may be generated and provided only for minor version updates, and major version updates (involving extensive changes to the deployment of the application) may be provided only as application packages that install the application anew on the device. As a second example, the developer may only generate and provide patches from a particular application version to a sequentially following application version. If a user wishes to skip one or more intermediate versions while updating from an earlier version to a (non-consecutive) later version, the user may obtain and apply the series of patches that incrementally update the application to each successive version in the sequence. As a third example, the developer may deprecate older application versions of the application, and may entirely remove older versions in order to reduce the set of available options and an unhelpful consumption of resources of the application server in hosting application packages and application patches that are no longer in use.

FIG. 1 presents an illustration of an exemplary scenario 100 featuring the deployment of an application 102 by an application server 104 to a device 114 operated by a user 120. In this exemplary scenario, the application 102 exists in three application versions 108 (respectively identified as version 1, version 2, and version 3), and in two application variants 110 respectively targeting a 32-bit architecture and a 64-bit architecture. The application server 104 may be configured to deploy a desired application version 108 and application variant 110 for a particular device 114. In particular, the application server 104 may include an application package 112 for each application version 108 and application variant 110 (e.g., six distinct application packages 106), each of which may be obtained and invoked to deploy the application 102 anew on a device 114 (e.g., by copying a set of application resource 118 into a memory 116 of the device 114, such as a memory circuit, a hard disk drive, a solid-state storage device, or a magnetic or optical disc). In order to update the application 102 from a first application version 108 to a second application version 108, or to change to a different application variant 110, a user 120 may first remove any existing deployment of the application 102 from a device 114, and then install the application 102 using the application package 112 for the selected application version 108 and application variant 110. However, this manner of updating the application 102 may be inefficient and disruptive to the user 120. Accordingly, the application server 102 also includes a set of application patches 112 configured to update a deployment of an earlier application version 108 of the application 102 (of a particular application variant 110) to the consecutively following application version 108 (of the same application variant 110). In order to update the application 102 from an earlier application version 108 to a later application version 108 that does not consecutively follow the earlier application version 108, and as illustrated in the exemplary scenario 100 of FIG. 1, the user 120 may obtain a set of application patches 112 that incrementally and sequentially update the application 102 from a first application version 108 to the succeeding application version 108, and may apply the application patches 112 in sequence to achieve the deployment of the desired application version 108.

The techniques for deploying applications 102 to devices 114 depicted in the exemplary scenario 100 of FIG. 1 are often utilized, and may present some advantages. For example, these techniques may involve a comparatively simple application server 104 (possibly comprising a file server that simply stores and provides requested application packages 106 and application patches 112), and a comparatively simple installation process on a device 114 (e.g., the device 114 may not even have a specialized installer, but may simply be configured to obtain and execute any provided application package 106 and application patch 112). However, the techniques in the exemplary scenario 100 of FIG. 1 also present several disadvantages. As a first example, although the application 102 only exists in three application versions 108 and two application variants 110, the application server 102 has to store a large number of application packages 106 and application patches 112 to enable the deployment of the application 102 in a selected application version 108 and application variant 110. The large number of such objects consumes significant storage space on the application server 104 (and does so inefficiently if many resources are duplicated in two or more objects). As a second example, the large number and variety of application packages 106 and application patches 112 increases the complexity of the deployment process; e.g., the selection of a suitable object may involve complex logic implemented on the device 114 and/or careful selection by the user 120. Moreover, the user 120 and/or device 114 may inadvertently select an incorrect application package 106 or application patch 112, resulting in an undesirable and possibly incorrect deployment of the application 102 to the device 114 (e.g., deploying a 32-bit application variant 110 on a 64-bit device 114 may result in reduced performance of the application 102, while deploying a 64-bit application variant 110 on a 32-bit device 114 may render the application 102 inoperative). As a third example, the incremental updating of the application 102 from version 1 to version 3 through the incremental application of application patches 112 is inefficient in several respects. For example, the application patches 112 may apply only small changes to only one application resource 118, but each application patch 112 may include a full updated version of the application resource 118, which may take a long time to retrieve (particularly for a large application resource 118 and/or over a slow network connection), may consume a large amount of storage capacity to store each application patch 112, and a significant duration and consumption of computing resources to copy the updated version of the application resource 118 over the preceding version of the application resource 118. Moreover, the changes to the application resource 118 implemented by the first application patch 112 (updating from version 1 to version 2) may be redundant with, and partially or even wholly overwritten by, the second application patch 112 (updating from version 2 to version 3), resulting in an unproductive consumption of time and computing resources during the changes induced by the first application patch 112 that are promptly overwritten by the second patch 112. As a fourth example, even this large set of application patches 112 for a comparatively small number of application versions 108 and application variants 110, some changes may be unavailable; e.g., application patches 112 are not available to transform the application 102 between 32-bit application variant 110 and the 64-bit application variant 110, and the user 120 may achieve such changes only by obtaining the desired application package 106, completely uninstalling the application 102, and reinstalling the application 102. These and other disadvantages may arise from the comparatively simple application deployment techniques illustrated in the exemplary scenario 100 of FIG. 1.

The disadvantages of these simple techniques may be alleviated in various ways by implementing sophisticated deployment techniques on the application server 104, application packages 106, and/or application patches 112, with logic that enables the updating of an application 102 from several different application versions 108 and/or application variants 110 to a particular application version 108 and application variant 110. As a first example, the application server 104 may be cognizant of the incremental changes between any two application versions 108 of the application 102. Upon receiving a request to update an earlier application version 108 of the application 102 to an updated application version 108, the application server 104 may identify the series of changes involved in each node in the sequence of version updates between the specified application versions 108 (e.g., aggregating the change logs in each sequential update of the application version 108 of the application 102), and may generate and deploy to the device 114 a specialized application patch 110 configured to bring the application 102 to the desired application version 106 and application variant 108. As a second example, an application package 106 may include the alternative application resources 118 of several application variants 110 for a particular application version 108 (e.g., different language libraries that may be adapted to present the user interface of the application 102 in a particular language) and may deploy a particular application variant 110 of the application version 108 to a device 114 (e.g., an application variant 110 selected by the user 120, or an application variant 110 that is suitable for the device 114, such as the particular architecture of the device 114 or a culture or language of the operating environment of the device 114). As a third example, the application packages 108 and/or application patches 110 may be generated in a modular and/or pluggable manner (e.g., a set of application libraries adapted for different platforms; a set of executable binaries providing different feature sets of an application library to the user 120; and a set of language libraries that may be plugged into a user interface to communicate with the user 120 in a particular language). The deployment of the application 102 to the device 114 may involve selecting (by a user 102 or an automated process) a suitable variant of each module and deploying each selected module to the device 114 in order to achieve the complete set of application resources 118 for a particular application version 108 and application variant 110 of the application 102.

However, such complexities may cause additional problems. As a first example, more complex deployment logic may be more difficult to maintain, and may scale in a prohibitive manner with a growing number of application versions 108 and application variants 110. For example, a development suite and/or application server 104 may have to perform an extensive evaluation of the differences between two application versions 108 and/or application variants 110 of an application 102 in order to identify the differences and generate metadata identifying the semantic differences (e.g., added features, changed libraries, and the addition, bifurcation, merging, or deprecation of application variants 110) that may later be used to deploy the application 102 to a device 114. Moreover, in addition to generating a complex deployment process maintained by an administrator of the application server 104 (often involving a more complex configuration of the application server 104 than as an ordinary file server), such complex deployment techniques may result in a complex build process maintained by the application developer. As a second example, the complexity in deploying the application 102 from the application server 104 to a device 114 may involve an extensive evaluation of the characteristics of the device 114 and the current deployment state of the application 102 on the device 114, thereby consuming a significant amount of computing resources of the application server 104 and/or application device 114, and possibly the attention of the user 120, in order to achieve the deployment or updating of the application 102 to the device 114. Moreover, such consumption may be invoked frequently if the application 102 is updated often (e.g., a security package may be updated daily to address recently identified security threats). As a third example, the complexity of the deployment (e.g., a specialized communications protocol that enables the application server 104 and the device 114 to interoperate in order to achieve the deployment of applications 102) may increase the probability of a failure in the deployment process that leads to confusion, incorrect deployment to the device 114, and/or an inability to deploy or update the application 102 on the device 114. These and other disadvantages may arise from the complexities of sophisticated deployment techniques.

B. Presented Techniques

Presented herein are techniques that may achieve the deployment of an application 102 to a device 114 in a comparatively simple, yet robust manner. In accordance with these techniques, an application package may comprise the application resources 118 for an application version 108 of the application 102 (and possibly variant application resources 118 for application variants 110). In particular, the application resources 118 may be conceptually segmented into one or more blocks, e.g., of a fixed or variable size, and selected arbitrarily and/or in view of the structure and/or contents of the application resource 118. A block map may be generated and associated with the application package (e.g., stored in the application package, or stored separately but associated with the application package) that, for respective blocks of respective application resources 118, specifies a hashcode generated by an application resource. When a request is received to deploy the application 102 to a device 114, a determination may be made as to whether an application version 106 already exists on the device 114. If not, then the application package 106 may be entirely retrieved and installed on the device 114. However, if some application version 106 of the application 102 has previously been deployed to the device 114, the device 114 may differentially update the application 102 using the block map. For example, the device 114 may first retrieve the block map of the application package 106 and compare the hashcodes of respective application resources 118 in the application package 106 with the hashcodes of corresponding blocks of the application 102 on the device 114 (e.g., that already exist in the memory 116 of the device 114) in order to identify the updated blocks in the application version 108 and application variant 110 represented by the application package 106. The device 114 may then retrieve from the application package 106 only the updated blocks, and may either replace the corresponding blocks of the earlier deployment of the application 102 with the updated blocks, or may store the updated blocks in the memory 116 alongside the corresponding blocks. Upon receiving a request to execute the application 102 (and, in particular, to execute a specific application version 108 specified by the user 120 and/or automatically selected by the device 114), the device 114 may retrieve the blocks stored in the memory 116 for the application version 108, and semantically (if not literally) aggregate the blocks to represent the application resources 118 of the application version 108.

Figure 2:
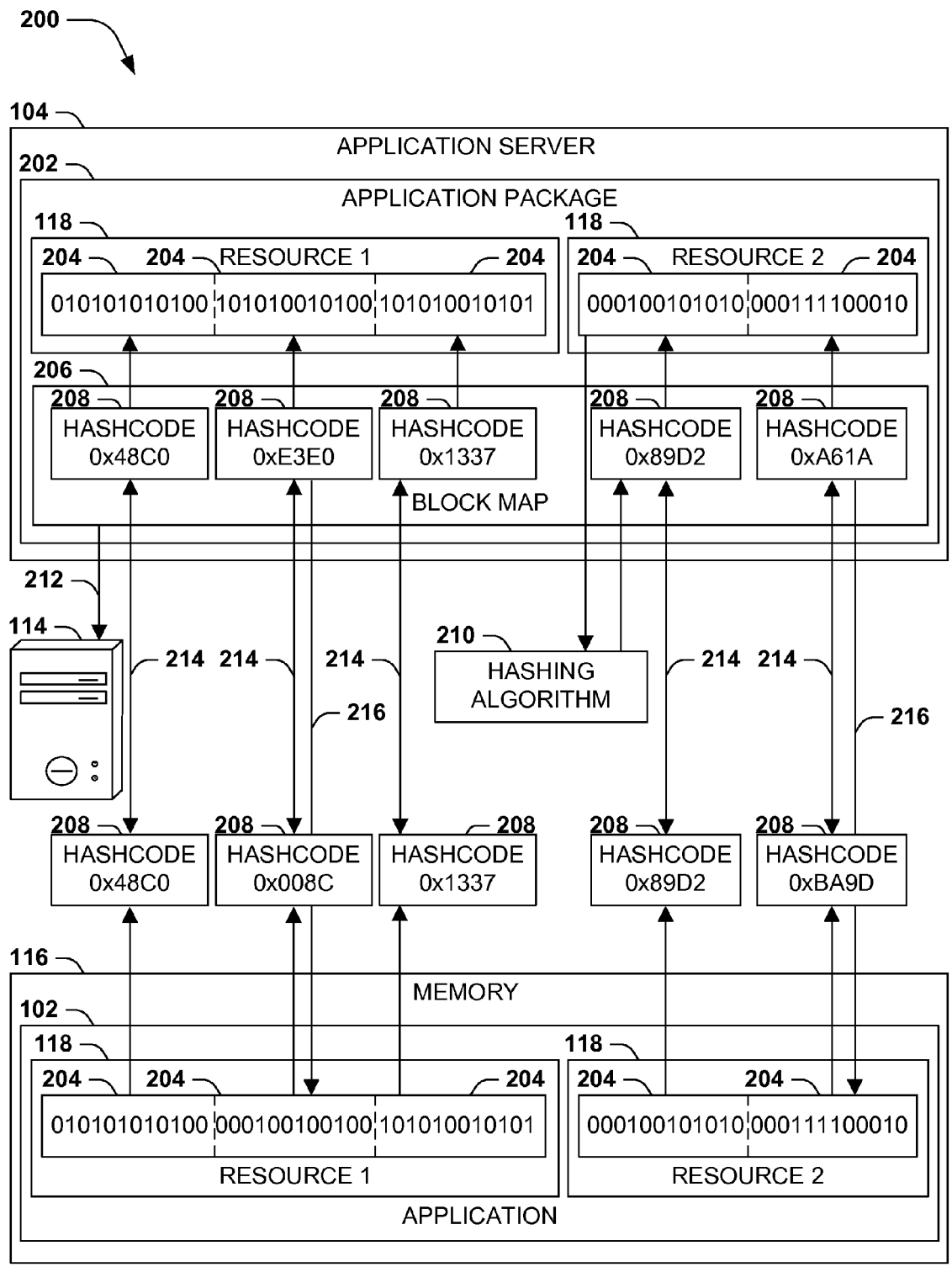
FIG. 2 is an illustration of an exemplary scenario featuring a deployment of an application package to a device using a block map of the application package in accordance with the techniques presented herein.

FIG. 2 presents an illustration of an exemplary scenario 200 featuring a deployment of an application 102 to a device 114 according to the techniques presented herein. In this exemplary scenario 200, the application server 104 does not store a large set of application packages 106 and patches 112, but simply stores an application package 202 including the application resources 118 of an application version 108 of the application 102, and generates and associated with the application package 202 a block map 206 specifying, for respective blocks 204 of the application resources 118, a hashcode 208 of the binary contents of the block 204 calculated with a hashing algorithm 210. The blocks 204 of each application resource 118 may be selected arbitrarily (e.g., segmenting the application resource 118 at regular intervals, such as 64 kb blocks 204 from the beginning of the application resource 118 to the end of the application resource 118), or may be specified in a particular manner (e.g., based on the structure or the updated portions of the application resources 118). In order to deploy the selected application version 108, the device 114 first examines the memory 116 and identifies an earlier deployment of the application 102 (e.g., the presence of application resources 117 of an earlier application version 108). Therefore, the device 114 retrieves 212 the block map 206 and performs a comparison 214 of the hashcodes 208 with the hashcodes 208 of corresponding blocks 204 of the application resources 118 stored in the memory 116. The latter hashcodes 208 may either be calculated on a just-in-time basis (e.g., the device 114 may invoke the hashing algorithm 210), or may be retrieved from a block map 206 stored in the memory 116 for the previous deployment of the application 102. The device 114 may therefore identify updated blocks having different hashcodes 208 in the application package 202 than the corresponding blocks 204 stored in the memory 116 of the device 114, and may initiate a retrieval 216 of the updated blocks 204, which may replace the corresponding blocks 204 in the memory 116 or may be stored alongside the other blocks 204 in the memory 116. If the device 114 stores a copy of the block map 206 for the deployment of the application 102 in the memory 116, the device 114 may also update the hashcodes 208 of the block map 206 for the updated blocks 204. In this manner, the device 114 achieves the updating of the application 102 in an efficient manner through the use of the block map 206 according to the techniques presented herein.

These deployment techniques may present several advantages in the deployment of the application 102 as compared with other deployment techniques (including the deployment techniques illustrated in the exemplary scenario 100 of FIG. 1 and the more complex deployment techniques discussed herein). As a first example, the techniques presented herein enable the deployment of the application 102 in a comparatively simple manner, e.g., by reducing or eliminating the specialized configuration of the application server 104; by avoiding a redundant retrieval of blocks and/or entire application resources 118 that have not been updated; by reducing the number of blocks of the application resources 118 retrieved to achieve the update to any particular version; and by reducing the redundant storage of identical copies of a block in different application packages in different application packages 106, application patches 108, and in the memory 116 of the device 114. As a second example, the updating of an application 102 from a first application version 108 to a second application version 108 does not involve a sophisticated evaluation of the semantics of each application version 108, such as an examination of the change log indicating the changes implemented in an application version 108; rather, the generation of the application package 202 simply involves the computation of hashcodes for respective blocks of the respective application resources 118 and the generation of the block map. These techniques therefore do not involve specialized versioning logic has to be developed, maintained, and/or utilized by the development suite, application server 104, the administrator of the application server 104, the user 102, or the device 114. Indeed, any application 102 may be updated to any application version 108 and application variant 110 using an application server 104 configured as an ordinary file server and a generalized updating engine executing on the device 114 to perform the comparisons of the block map 202 and hashcodes 208 and retrieve either the application package 202 or respective blocks 204 thereof. As a third example, these techniques enable the generation and use of one application package 112 either to install the application 102 anew or to update the application 102 from any previous application version 108, and also using any selected application variant 110, as well as the concurrent and a de-duplicated storage in the memory 116 of the device 114 of multiple application versions 108 and/or application variants 110 of the application 102. Even unusual adjustments of the application, such as an upgrading from a very early application version 108 of the application 102 to a much later application version 108 of the application 102, a downgrading of a deployed application version 108 to an earlier application version 108 of the application 102, or a transformation from a first application variant 110 to a second application variant 110, may be achieved using the same updating logic as applied for routine, sequential updates. These and other advantages may be achieved through the generation of application packages 202 including a block map 202, and the deployment of applications 102 to devices 114 using an application package 202 including a block map, in accordance with the techniques presented herein.

C. Primary Embodiments

Figure 3:
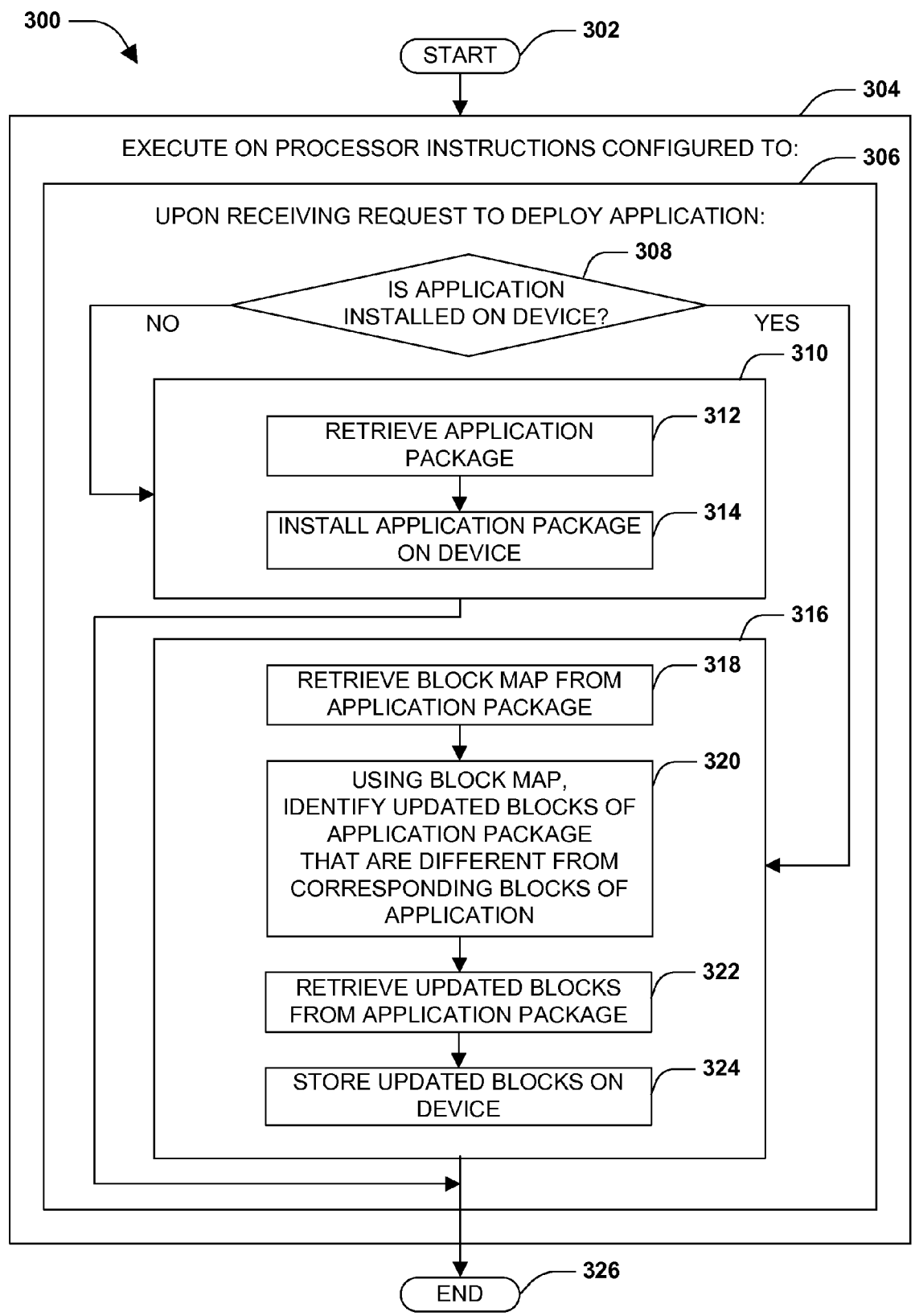
FIG. 3 is a flowchart illustrating an exemplary method of installing an application package on a device in accordance with the techniques presented herein.

FIG. 3 presents an illustration of a first exemplary embodiment of the techniques presented herein, illustrated as an exemplary method 300 of deploying applications 102 from application packages 202 comprising a block map 206 to a device 114 having a processor. The exemplary method 300 may be implemented, e.g., as a set of software instructions stored in a memory component (e.g., a system memory circuit, a platter of a hard disk drive, a solid state storage device, or a magnetic or optical disc) of a device having a processor and a hashing algorithm 210, that, when executed by the processor of the device, cause the processor to perform the techniques presented herein. The exemplary method 300 begins at 302 and involves executing 304 the instructions on the processor. More specifically, the instructions are configured to, upon receiving 306 a request to deploy an application 102, determine 308 whether the application 102 is installed on the device 114. If a negative determination 310 is made that the application 102 is not installed on the device 114, the instructions are configured to retrieve 312 the application package 202 and install 314 the application package 202 on the device 114. However, if a positive determination 316 is made that the application 102 is installed on the device 114, the instructions are configured to retrieve 318 the block map 206 for the application package 202, and using the block map 206, identify 320 updated blocks 204 of the application package 202 that are different from corresponding blocks 204 of the application 102. The instructions are also configured to, following this positive determination 316, retrieve 322 the updated blocks 204 from the application package 202, and store 324 the updated blocks 204 on the device 114. In this manner, the exemplary method achieves the deployment of the application 102 to the device 114 using the block map 206 for the application package 202 in accordance with the techniques presented herein, and so ends at 326.

Figure 4:
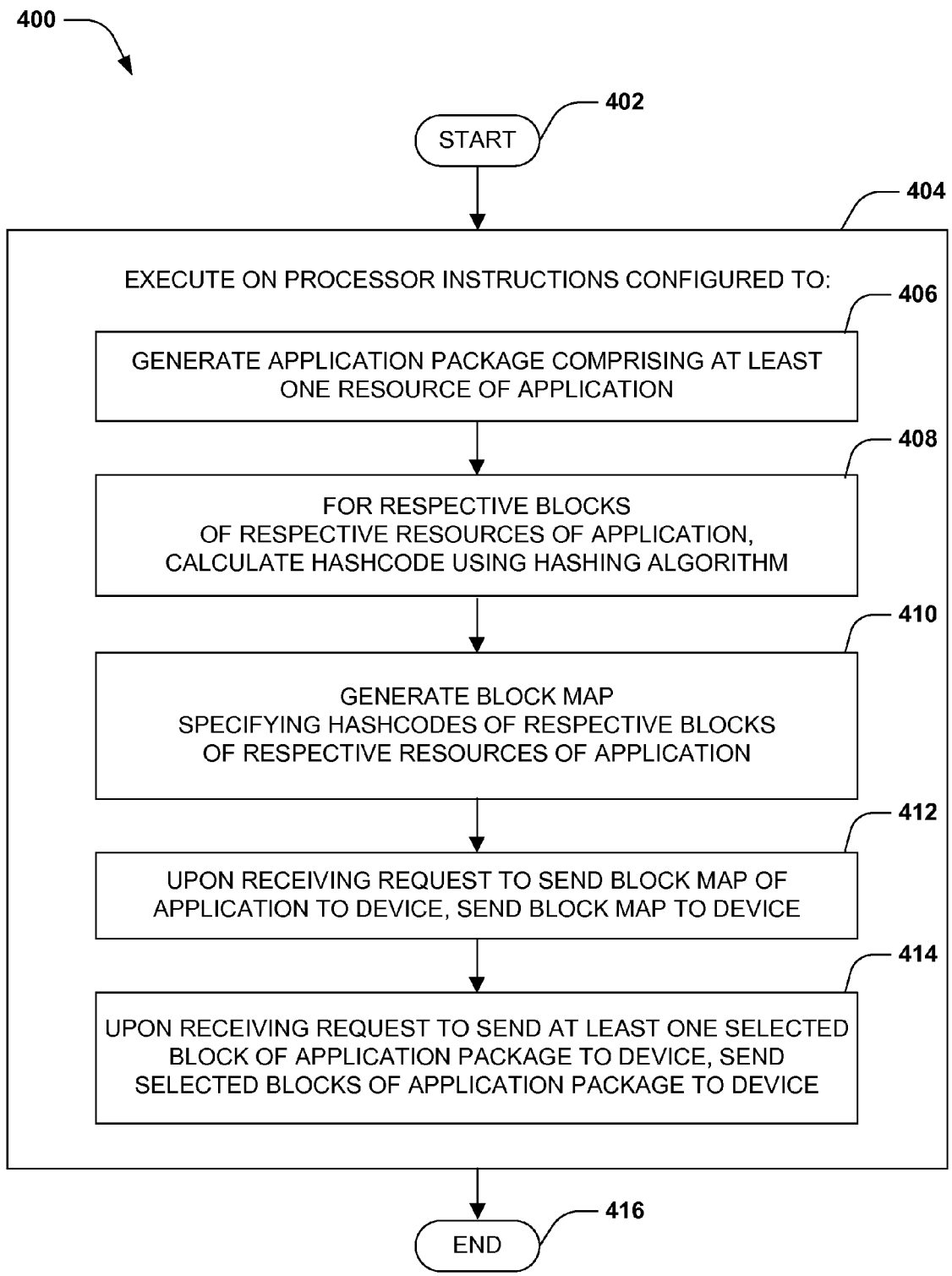
FIG. 4 is a flowchart illustrating an exemplary method of generating an application package and deploying the application to a device in accordance with the techniques presented herein.

FIG. 4 presents a second embodiment of these techniques, illustrated as an exemplary second method 400 of deploying an application 102 to at least one device 114. The exemplary method 400 may be implemented, e.g., as a set of software instructions stored in a memory component (e.g., a system memory circuit, a platter of a hard disk drive, a solid state storage device, or a magnetic or optical disc) of a device having a processor and a hashing algorithm 210, where such instructions, when executed by the processor of the device, cause the device to perform the techniques presented herein. The exemplary method 400 begins at 402 and involves executing 404 the instructions on the processor. More specifically, the instructions are configured to generate 406 an application package 202 comprising at least one application resource 110 of the application 102. The instructions are also configured to, for respective blocks 204 of respective application resources 118 of the application 102, calculate 408 a hashcode 208 using the hashing algorithm 210. The instructions are also configured to generate 410 a block map 206 specifying the hashcodes 208 of respective blocks 204 of respective application resources 118 of the application package 202. The instructions are also configured to, upon receiving a request to send the block map 206 of the application 102 to a device 114, send 412 the block map 206 to the device 114. The instructions are also configured to, upon receiving a request to send at least one selected block 204 of the application package 202 to a device 114, send 414 the selected blocks 204 of the application package 202 to the device 114. In this manner, the exemplary method 400 achieves the deployment of the application 102 to the device 114 by generating and using a block map 206 in accordance with the techniques presented herein, and so ends at 416

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
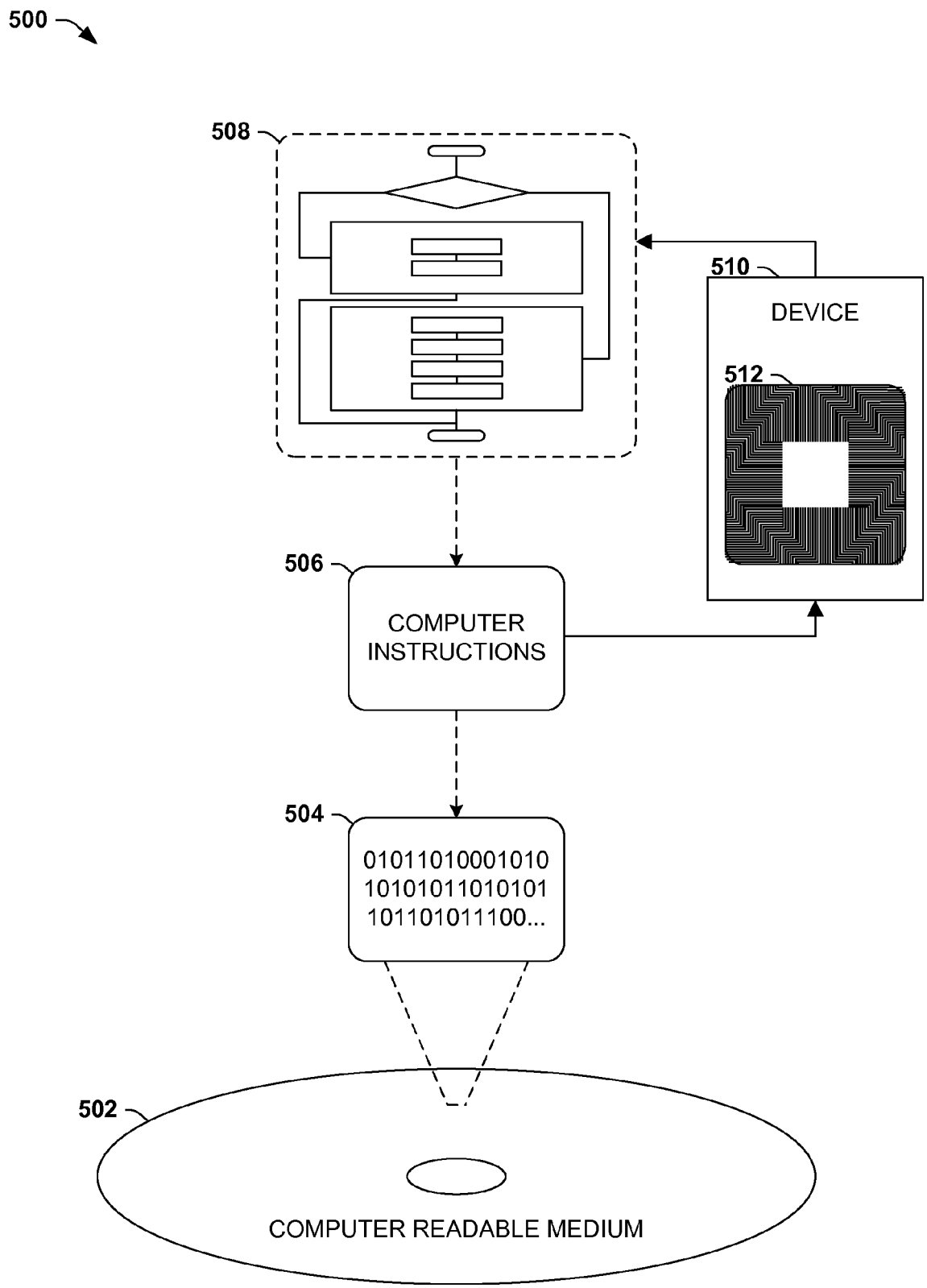
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of computer instructions 506 configured to operate according to the principles set forth herein. In one such embodiment, the processor-executable instructions 506 may be configured to perform a first method of deploying applications 102 from application packages 202 comprising a block map 206 to respective device 114, such as the exemplary method 300 of FIG. 3, or the exemplary method 400 of FIG. 4. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3 and the exemplary system 400 of FIG. 4) to confer individual and/or synergistic advantages upon such embodiments.

D1. Scenarios

A first aspect that may vary among embodiments of these techniques relates to the scenarios wherein such techniques may be utilized. As a first variation of this first aspect, these techniques may be used to deploy many types of applications 102, including operating systems, hardware drivers, software libraries, document and media creation applications, device diagnostic and maintenance utilities, games, and communications applications.

As a second variation of this first aspect, these techniques may be used to deploy such applications 102 to a large number and variety of devices 114, such as workstations; servers; notebook, tablet, and palm form-factor computers; smartphones; portable media players; game consoles; a virtual machines. Additionally, the devices 114 may be owned and/or operated by one user 120 or many users 120, and may represent a collection of unrelated devices, a collection of interoperating devices (e.g., a device mesh or server farm), or a collection of devices deployed to the members of an organization, such as a corporation or university.

As a third variation of this first aspect, these techniques may be used to deploy applications 102 from many types of application servers 104. As noted herein, the comparative simplicity of the deployment techniques presented herein may enable the deployment of the application package 202 comprising the block map 206 by many types of application servers 104, ranging from simple file servers that may simply store the application package 202 (and may provide access to respective blocks 204 of the application package 202) and the block map 206 (stored together with or inside the application package 202, or stored apart from and associated with the application package 202) to sophisticated application servers 104 that may utilize a set of information about one or more applications 102, application versions 108, application variants 110, application packages 202, devices 114, deployments of the application 102 to the devices 114 (e.g., a deployment history for a particular device 114), and users 120. Thus, while the techniques presented herein enable the reduced complexity of the deployment of the application 102 without specially configuring the application server 104, such specialized configuration may present additional advantages and/or features, such as recommendations of a particular application version 108 or application variant 110 to a device 114 or user 120; pushed notifications to devices 114 or users 120 of updates to the applications 102; the configuration of applications 102 for particular circumstances (e.g., configuring an email application to utilize a particular email server); the tracking and diagnosis of failed or postponed deployments; e-commerce interactions that process payments submitted by users 120 for the deployment of applications 102; and the issuance, validation, management, and revocation of licenses and permissions for such applications 102.

As a fourth variation of this first aspect, the application package 202 may be structured in many ways. As a first example, the application package 202 may be compressed using various compression techniques or uncompressed. As a second example, the application package 202 may be encrypted and/or cryptographically signed to limit the usage and/or alteration of the application 102. As a third example, the application package 202 may also include a manifest, such as metadata describing the application 102, application version 108, or application variant 110 that is not included in the block map 206; human-readable documentation about the application 102, application version 108, or application variant 110; and/or human-readable and/or machine-executable instructions for building, configuring, and/or deploying the application 102 within the device 104. In particular, the application package 202 may include various application identifiers that may be used to identify the application 102 (e.g., may be associated with respective application resources 118 in order to identify those that are associated with the application 102, which may promote the identification of a prior deployment of the application 102 on the device 114), and/or to compare the application identifiers of the installed application 102 with the application identifiers of the application package 202 of the application 102. An exemplary application identifier set may include an application name, an application publisher, and an application source (e.g., a uniform resource identifier (URI) where the application 102 is described or stored, and/or from which the application package 202 was retrieved). As a fourth example, the application package 202 may include blocks 204 for multiple application versions 108 and/or application variants 110 of the application 102 (e.g., both invariant blocks that are identical for respective application versions 108 and/or application variants 110 and variant blocks that are specialized for particular application versions 108 and/or application variants 110). The block map 206 may indicate the availability of such versions and variations, and a device 114 may retrieve only the blocks 204 for the desired application version 108 and application variant 110. Alternatively, multiple application packages 202 may be provided by the application server 102, each comprising one or more application versions 108 and/or application variants 110.

As a fifth variation of this first aspect, the block map 206 for an application package 106 may be generated and/or formatted in many ways. As a first example, the block map 206 may be included in the application package 202; may be stored apart from and associated with the application package 202; or may be generated by the application server 102 on a just-in-time basis. As a second example, the block map 206 may be formatted in human-readable manner, a machine-executable manner, or both (e.g., as an extensible markup language (XML) document). As a third example, the block map 206 may include hashcodes 208 calculated for particular application resources 118 of the application package 202 (e.g., segmenting each application resource 118 in a particular manner, such as at regular intervals or according to an inherent structure of the application resource 118), and the block map 206 may represent the application package 202 as a set of application resources 118 respectively represented as a sequence of blocks 204 having a hashcode 208. Alternatively, the hashcodes 208 may be computed for blocks representing portions of the application package 202; e.g., the entire application package 202 may be segmented at regular intervals (e.g., 64 kb blocks), irrespective of the contents thereof (such as partitions between resources 118), and hashcodes 208 may be calculated for each block 204. As a fourth example, the manner of segmenting the application package 202 and/or application resources 118 into blocks 204 may be arbitrary (e.g., regular intervals), according to an inherent structure of the application resources 118, or according to a history of changes of the application resources 118 (e.g., segmenting the application resources 118 into frequently updated blocks 204 and infrequently updated blocks 204). Moreover, a particular segmentation technique may be consistently used, or the segmentation technique may vary between applications 102, application packages 202, and/or portions of an application package 202. As a fifth example, if one or more application resources 118 of the application package 202 is compressed, the hashcodes 208 may be computed for each compressed block 204 of the application resource 118, or for the uncompressed segment corresponding to the compressed block 204 of the application resource 118. As a sixth example, multiple sets of hashcodes 208 may be included in an application package 202; e.g., a first set of hashcodes 208 calculated for a coarse granularity of blocks 204 may enable a rapid identification of general areas of updates in an application package 202, and the particular areas of updates may be more finely pinpointed by use of a second set of hashcodes 208 calculated for a fine granularity of blocks 204. Moreover, different sets of hashcodes 208 may use different hashing algorithms 210, e.g., a collision in a pair of hashcodes 208 of two blocks 204 having different contents may be resolved by comparing a second pair of hashcodes 208 calculated by a different hashing algorithm 210. As a seventh example, the hashcodes 208 and/or the application package 202 may be cryptographically signed in order to preclude or identify attempts to alter the contents of the application package 202. As an eight example, the block map 206 may, in lieu of hashcodes 208, include other descriptors of the blocks 204 that may enable such comparisons, including a date and time of last modification of the blocks 204, or a version number for respective blocks 204.

As a sixth variation of this first aspect, a device 114 may be configured to deploy an application 102 in various ways. As a first example, the operating environment of the device 114 may include a deployment engine that is configured to deploy applications 102 using application packages 202 and block maps 206 according to the techniques presented herein. Alternatively, an embodiment of these techniques may be provided by the application server 102, e.g., as a general application installer, or may bundle the embodiment with an application package 202. As another alternative, a first device 114 may be configured to utilize an embodiment of these techniques to install applications 102 on a second device 114; e.g., a management console within an organization may manage the deployment of applications 102 on the devices 114 operated by members of the organization, or a workstation operated by a user 120 may utilize an embodiment in order to manage the deployment of applications 102 to other devices 114 operated by the same user 120, such as a device mesh of devices 114 such as a mobile phone, portable media player, and notebook computer. As a second example, the device 114 may, after deploying an application 102, store the block map 206 for later use (e.g., for later comparisons of current hashcodes 208 of the blocks 204 of an application 102 with the hashcodes 208 of a block map 208 of an updated application package 202). Alternatively, the device 114 may discard the block map 208, and may perform any such comparisons by calculating the hashcodes 208 on a just-in-time basis.

As a seventh variation, the device 114 may provide other features related to the deployment of applications 102 according to the techniques presented herein. As a first example, the device 114 may be configured to log the deployment of applications 102 to the device 114. As a second example, the device 114 may be configured to enable the user 120 to manage the deployment of applications 102. As a third example, the device 114 may be configured to monitor the application 102 for changes (e.g., attempts by a user 102 to tamper with the application, interference with or modification of the application 102 by another application 102, or data corruption of the memory 116 of the device 114) by verifying that current hashcodes of respective blocks 204 of an application 102 continue to match the hashcodes 208 specified in the block map 206, and may report such changes to a user 120. As a fourth example, the device 114 may be configured to repair altered blocks 204 (e.g., by requesting corresponding blocks 204 from the application server 104 and restoring the altered blocks 204 to the original blocks 204 of the application package 202). As a fifth example, the device 114 may be configured to detect the affliction of the application 102 by malware by receiving malware hashcode list comprising hashcodes 206 that are indicative of malware; comparing the hashcodes 206 of respective blocks 204 of the application 102 with the hashcodes 206 of the malware hashcode list; an upon identifying a block 204 of the application 102 having a hashcode 204 matching a hashcode 204 of the malware hashcode list, restore the block 204 by requesting and replacing it with a corresponding block 204 from the application package 202. As a sixth example, the device 114 may be configured to roll back failed installations of applications (e.g., upon detecting a failure to complete the deployment of an application 102, reversing any changes involved in the failed deployment, such as by discarding the updated blocks 204 received for an updated application version 108 of the application 102). Those of ordinary skill in the art may devise many such scenarios wherein the techniques presented herein may be utilized.

D2. Application Versions and Application Variants

A second aspect that may vary among embodiments of these techniques relates to applications 102 having a set of application versions 108 and/or application variants 110. As a first variation, an embodiment of these techniques may be configured to identify the application versions 108 and/or application variants 110 of an application 102 in a particular manner. As a first example, respective application versions 108 may be identified by various types of application version identifiers, e.g., a globally unique identifier (GUID), an integer, a floating-point number, a date, or a distinctive string. Some types of application version identifiers may only distinctively identify the application version 108 with respect to other application versions 108. However, other types of application version identifiers may indicate additional information, e.g., a sequential order of the application version 108 with respect to other application versions 108; information about the versioning tree or history of the application 102, such as versioning forks; the significance of the application version 108 (e.g., a major or minor update of a preceding application version 108); or a date on which the application version 108 was generated or published. Moreover, where the application versions 108 have a sequential order (e.g., increasing application version numbers respectively representing an advancement of the application 102 with respect to lower-numbered application versions), the device 114 may be configured only to support forward versioning of the application 102. As one such example, upon receiving a request to deploy an application 102 that is already deployed on the device 114, the device 114 may be configured to compare the application version 110 of an application 102 installed on the device 14 with the application version 110 of the application package 202, and to refrain from downloading blocks 204 of the application package 202 if the application version 110 of the application package 202 is not greater than that of the application 102 installed on the device 114.

As a second variation, an application 102 or application package 108 may include one or more application variant identifiers that identify the application variant 110. An exemplary application variant identifier set may include an application device architecture (e.g., the device, operating environment, platform, or context under which the application variant 110 may be invoked); the application language (e.g., the programming language in which the application variant 110 was written, and/or the human language with which the application variant 110 communicates with users 120); and the application region (e.g., a nation, geographic region, or culture targeted by the application variant 110). Such application variant identifiers may enable a user 120 or device 114 to determine available options among the application variants 110 of the application 102; to select among several application variants 110 a particular application variant 110 to be deployed to the device 114; and to determine the properties of a particular deployment of an application 102 to a device 114 (e.g., the targeting of an application resource 118 stored in a memory 116 of the device 114).

As a fourth variation, an embodiment of these techniques may detect the availability of new application versions 108 and/or application variants 110 in various ways. As a first example, the device 114 may poll the application server 104 for new application versions 108 and/or application variants 110 at a particular frequency, upon receiving a request to invoke the application 102, or upon the request of a user 120. Alternatively or additionally, the application server 104 may be configured to push notifications to the device 114 of the availability of new application versions 108 and/or application variants 110. As a second example, the device 114 may comprise an application disposal policy that retains a particular number of older application versions 108, such as the last six versions of an application 102 installed on a device 1114).

As a fifth variation, an embodiment of these techniques may be configured to select among and deploy application versions 108 and/or application variants 110 for retrieval, presentation to the user 120, and invocation in various ways. As a first example, an application server 104 may automatically notify a device 114 to which an application 102 been deployed of the availability of new application versions 108 and/or application variants 110. The device 114 may automatically download and deploy the application version 108 and/or application variant 110. Alternatively, the device 114 may notify a user 120 of such availability, indicate the semantic differences (e.g., new features or performance improvements) and/or technical differences (e.g., changed files and resource utilization) between the new application version 108 and/or application variant 110. The device 114 may also enable the user 120 to select an application version 108 and/or application variant 110 for deployment, and may perform the updating according to the selection by the user 120. As a second example, upon receiving a request to invoke an application 102 having at least two application versions 108, the device 114 may, by default, invoke the latest or highest application version 108 of the application 102, but may enable the user 120 to specify an earlier application version 108 and may launch the earlier application version instead 108. As a third example, the device 114 may actually present the application versions 108 to the user 120 (e.g., presenting a first application version 108 and a second application version 108 of a particular application 102 to the user 120), and upon receiving from the user 120 a selected application version 108, may invoke the selected application version 108. Similar techniques may be utilized to retain, dispose, present, maintain, and/or invoke various application variants 110 of the application 102.

As a sixth variation, an embodiment of these techniques may apply the updating of an application version 108 and/or application variant 110 in various ways. As a first example, upon updating an application 102, a device 114 may simply overwrite or discard the preceding deployment of the application 102, and may therefore provide only the updated application version 108 and/or application variant 110. For example, upon retrieving an updated block 204 for an updated version of the application 102, the device 114 may be configured to discard the corresponding block 204 of the earlier application version 110 of the application 102 that was installed on the device 114. Alternatively, the device 114 may store the updated blocks 204 of the later application version 108 and also retain the corresponding blocks 204 of the earlier application version 108 in order to provide both application versions 108 of the application 102 to the user 120. This retention may enable an efficient storage of multiple application versions 108 and/or application variants 110 of the application 102. For example, rather than maintaining two or more full deployments of the application 102, the device 114 may retain the invariant blocks 106 of the application package 108 that are identical for respective application versions 108 and/or application variants 110, as well as the variant blocks 106 of the application package 108 that are specialized for each application version 108 and/or application variant 110. Such concurrent retention of the blocks 106 of multiple application versions 108 and/or application variants 110 may also enable other features, such as the capability of rolling back a later application version 108 of an application 102.

As a seventh variation, a device 114 may host a set of users 120 (who may operate the device 114 consecutively and/or concurrently), each of whom may have a selected set of applications 102 installed for use, including one or more applications 102 deployed in the manner presented herein. In such scenarios, application packages 202, application versions 108, and/or application variants 110 may be shared among the users 120 to achieve additional advantages. As a first example, if a first user 120 requests to deploy an application 102 to the device 114, the device 114 may determine whether the application 102 has already been deployed to the device 114 by a second user 120 (whether or not the second user 120 continues to use the application 102); if so, the device 114 may refrain from retrieving any portion of the application package 202, and even the block map 206, because these components may already be present in the memory 116 of the device 114. Rather, the device 114 may simply notify the first user 120 that the application 102 is promptly available, and present the application 102 to the first user 120. Similarly, multiple application versions 108 and/or application variants 110 may be maintained on the device 114 in support of multiple users 120 (e.g., at least two application variants 110 presenting the application 114 in at least two languages for a multilingual group of users 120). If a first user 120 requests to install an application version 108 and/or application variant 110, the device 114 may first determine whether the application version 108 and/or application variant 110 has already been installed on the device 104, and if so, may simply present the already deployed application version 108 and/or application variant 110 to the user 120. Conversely, when a user 120 deploys a new application 102, a new application version 108, or a new application variant 110, the device 114 may notify other users 120 of the device 114 of the availability or updating of the application 102. Moreover, respective users 120 may select a particular application version 108 and/or application variant 110. When a user 120 requests to invoke the application 102, the device 114 may identify the selected application version 108 and/or application variant 110 for invocation. Additionally, when the device 114 determines that an application version 108 and/or application variant 110 is no longer selected or used by the users 120 of the device 114, the device 114 may discard the variant blocks 206 stored in memory 116 for the unused application version 108 and/or application variant 110.

Figure 6:
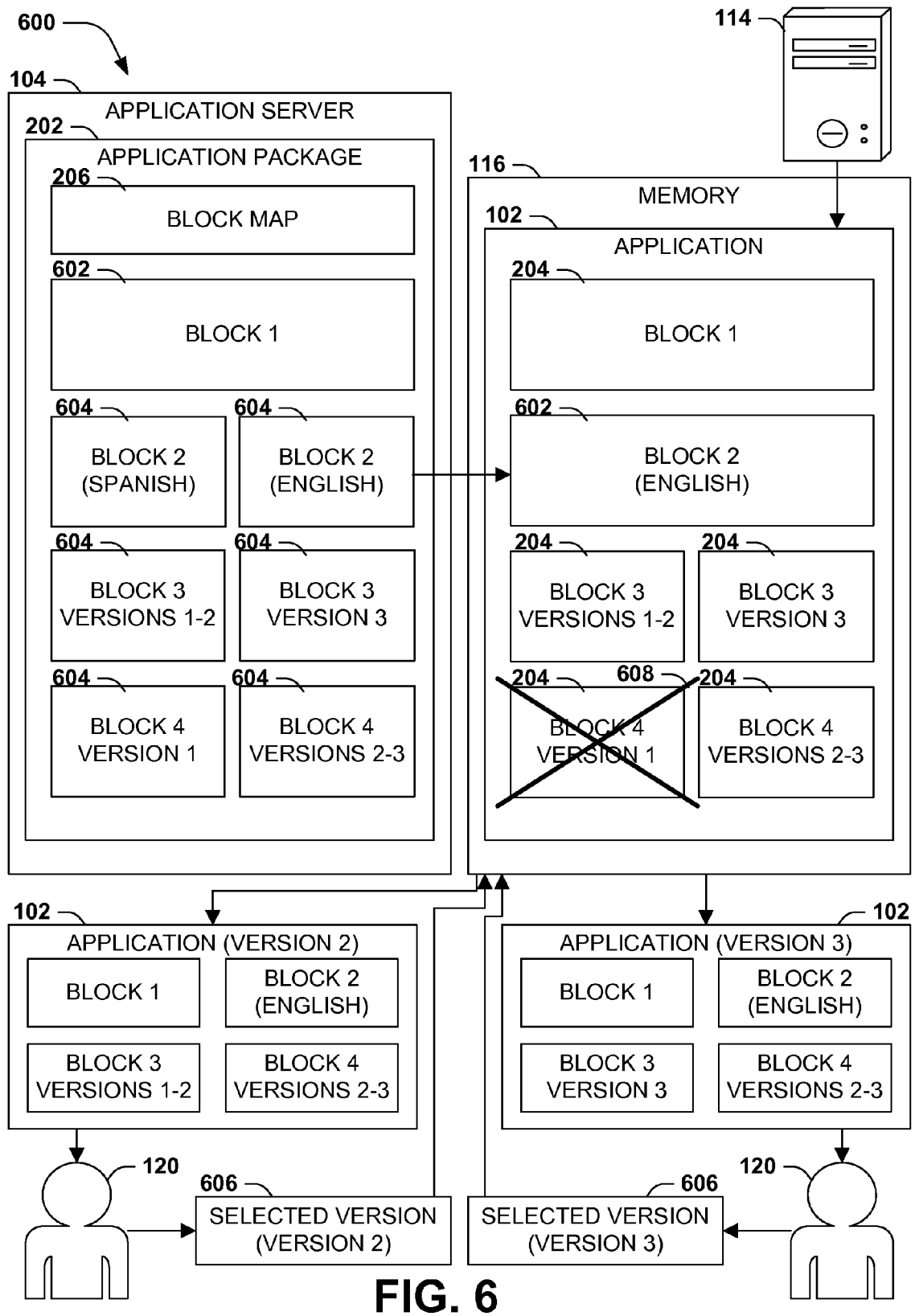
FIG. 6 is an illustration of an exemplary scenario featuring a presentation of respective version of an application to users of a device in accordance with the techniques presented herein.

FIG. 6 presents an illustration of an exemplary scenario 600 featuring the implementation of several variations in the aspects of the techniques presented herein. In this exemplary scenario 600, an application server 104 may store an application package 202 comprising a block map 206 and a set of blocks 204 comprising the application resource 116 of an application 102. In particular, the application 102 may comprise four discrete blocks 204 (numbered blocks 1 through 4), but the application package 202 may include blocks 204 for three application versions 108 (versions 1, 2, and 3) and two application variants 110 (an English language version and a Spanish language version). The application package 202 may therefore contain a set of blocks 204 including an invariant block 602 that is identical in all application versions 108 and application variants 110, and a set of variant blocks 604 that are specialized for one or more application versions 108 and/or application variants 110. The application 102 may be deployed to a device 114 hosting two users 120, each of whom may specify a selected version 606 (including a particular application version 108 and application variant 110) of the application 120. For example, the first user 120 may select version 2 and the English language variant, while the second user 120 may select version 3 and also the English language variant. The device 114 may therefore retrieve from the application server 104 all of the invariant blocks 602 of the application 102, and the variant blocks 604 of the application 102 supporting the application versions 108 and application variants 110 requested by the users 120. For example, the device 114 may retrieve and store both of the variant blocks 604 for block 3 of the application 102, since each variant block 604 supports an application version 102 that is used by at least one user 120, but may not retrieve or store the variant block 604 for the Spanish language application variant 110, as no user 120 is using this application variation 110. Therefore, upon receiving a request from a user 120 to invoke the application 102, the device 114 may retrieve from the memory 116 only the blocks 204 for the selected version 606 of the application 102, and may invoke the application 102 using the retrieved blocks 204. Moreover, if the users 120 migrate away from an application version 108 or application variant 110, the device 114 may discard the corresponding variant blocks 604. For example, one or both users 120 may initially have used version 1 of the application 102, but because neither user 120 currently uses version 1, the device 114 may discard 608 the variant block 204 supporting only this unused application version 108. In this manner, the device 114 may efficiently retrieve the application 102 from the application server 104, efficiently store the blocks 104 for the in-use application versions 108 and application variants 110, and flexibly present the selected versions 606 of the application 102 to the users 120 in accordance with the techniques presented herein. Those of ordinary skill in the art may devise many such variations in the versioning and variance of applications 102 in accordance with the techniques presented herein.

E. Computing Environment

Figure 7:
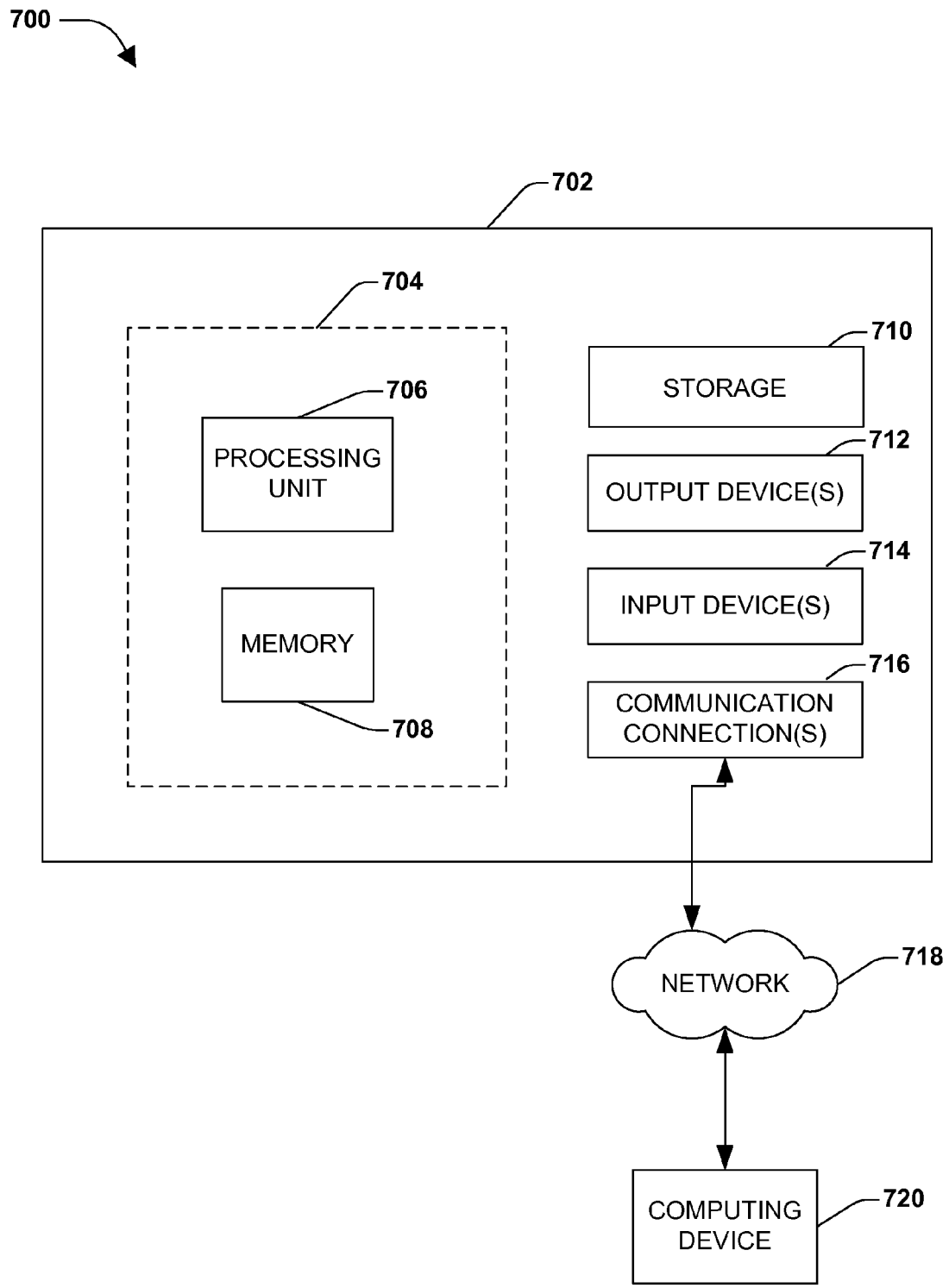
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 720 accessible via network 728 may store computer readable instructions to implement one or more embodiments provided herein. Computing device 712 may access computing device 720 and download a part or all of the computer readable instructions for execution. Alternatively, computing device 712 may download pieces of the computer readable instructions, as needed, or some instructions may be executed at computing device 712 and some at computing device 720.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media.

Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of providing a second application variant of an application stored as a first application variant on a device having a processor, wherein the application is hosted as a second application variant and is associated with a block map for the second application variant, the method comprising:
 executing on the processor instructions that, when executed on the processor, cause the device to:
 using the block map, distinguish updated blocks of the second application variant that are different from corresponding blocks of the first application variant from non-updated blocks of the first application variant;

selectively retrieve the updated blocks from the application server;

store the updated blocks in addition to the corresponding blocks of the first application variant; and responsive to receiving a request to provide a selected application variant of the application:

generate the second application variant by aggregating the updated blocks of the second application variant and the non-updated blocks; and provide the second application variant in response to the request.

2. The method of claim 1:

the application package comprising at least one application resource; and respective blocks of the application package comprising blocks of respective application resources of the application package.

3. The method of claim 1, the instructions configured to, upon failing to store at least one updated block on the device, discard the updated blocks stored on the device.

4. The method of claim 1:

respective application variants of the application comprising at least one application identifier; and determining whether the second application variant is installed on the device comprising: for respective installed applications, comparing the application identifiers of the first application variant with the application identifiers of the application package of the second application variant.

5. The method of claim 4, the application identifiers for respective application variants selected from an application identifier set comprising:

an application name;

an application publisher; and an application source.

6. The method of claim 1:

the application package comprising:

at least one invariant block that is included in the application variants of the application, and at least one variant block comprising:

a first variant block that is included in a first application variant, and a second variant block that is included in a second application variant;

retrieving the block map comprising:

receiving a selected application variant, and retrieving the block map for the selected application variant of the application; and retrieving the updated blocks comprising: retrieving the blocks for the selected application variant of the application.

7. The method of claim 6, respective application variants identified by at least one application variant identifier selected from an application variant identifier set comprising:

an application device architecture;

an application language; and an application region.

8. The method of claim 1:

the block map specifying a hashcode calculated for respective blocks of the application variant using a hashing algorithm;

identifying the updated blocks of the application package comprising: identifying blocks of the application variant having a different hashcode than the hashcode of a corresponding block of the application installed on the device; and the instructions configured to, upon storing the blocks of the second application variant, store the block map comprising the hashcodes.

9. The method of claim 8:

the instructions configured to, while storing the blocks of the second application variant:

for respective blocks of the application stored on the device:

using the hashing algorithm, calculate a current hashcode of the block, and compare the current hashcode of the block with the hashcode of the block in the block map.

10. The method of claim 1, the instructions configured to:

compare the application version of the first application variant installed on the device with the application version of the second application variant; and upon determining that the application version of the first application variant is not less than the application version of the second application variant, refraining from retrieving blocks of the application package.

11. The method of claim 10:

the request to deploy the application initiated by a first user;

the application installed on the device for a second user as an application version;

the application package having the application version of the application installed for the second user; and the instructions configured to present the application to the first user.

12. The method of claim 1, the instructions configured to, upon receiving from a user a request to invoke the application:

present the first application variant and the second application variant of the application to the user; and upon receiving from the user a selected application variant, invoke the selected application variant for the user.

13. The method of claim 1:

the device accessible to at least one user;

respective users specifying a selected application variant of the application; and the instructions configured to, upon receiving a request from a user to invoke the application:

identify the selected application variant of the application specified by the user, and invoke the selected application variant of the application.

14. The method of claim 13, the instructions configured to, upon identifying an unselected application variant of the application that is not specified by any user of the device, discard the blocks associated only with unselected application variant.

15. The method of claim 1:

retrieving the updated blocks from the application server comprising: for the respective updated blocks, retrieving from the application server a file that contains the updated block; and storing the updated blocks further comprises:

for respective files:

extracting at least one updated block from the file;

storing only the at least one updated block; and discarding a remainder of the file.

16. The method of claim 1, retrieving the updated blocks from the application server comprising: requesting from the application server only a portion of a file of the application containing the updated block.

17. A computer-readable storage medium storing instructions that, when executed on a processor of a device, enable execution of application variants of an application, by:
responsive to receiving a request to store a second application variant of an application having a first application variant that is stored on the device:
retrieving a block map for the second application variant;
using the block map, distinguishing updated blocks of the second application variant that differ from corresponding blocks of the first application variant from non-updated blocks of the first application variant;
selectively retrieving the updated blocks from the application package; and
storing the updated blocks in addition to the corresponding blocks of the first application variant; and
responsive to receiving a request to provide a selected application variant of the application:
identifying the blocks stored on the device comprising the selected application variant of the application;
generating the selected application variant by aggregating the updated blocks of the selected application variant and the non-updated blocks of the first application variant; and
providing the application aggregated from the blocks comprising the selected application variant.

18. A method of providing a predecessor application variant of an application that is stored, on a device having a processor as a modified application variant that has been modified from the predecessor application variant, the method comprising:
executing on the processor instructions that cause the device to:
retrieve a block map for the modified application variant;
using the block map, distinguish updated blocks of the modified application variant that are different from corresponding blocks of the predecessor application variant from non-updated blocks of the predecessor application variant;
selectively retrieve from the application server only the corresponding blocks from the application package; and
store the corresponding blocks of the predecessor application variant; and
responsive to receiving a request to provide the predecessor application variant of the application:
identify the blocks stored on the device comprising the predecessor application variant of the application;
generate the predecessor application variant by aggregating the corresponding blocks of the predecessor application variant and the non-updated blocks of the modified application variant; and
providing the application aggregated from the blocks comprising the predecessor application variant.

19. The method of claim 18:
the predecessor application variant retrieved from an application server;
the device comprising a malware hashcode list comprising hashcodes identifying malware; and
executing the instructions further causing the device to:
compare the hashcodes of respective blocks of the modified application variant with the hashcodes of the malware hashcode list; and
upon identifying a hashcode of an updated block of the modified application variant matching a hashcode of the malware hashcode list:
request a corresponding block for the predecessor application variant from the application server; and
upon receiving the corresponding block from the application server, replace the updated block of the modified application variant with the corresponding block of the predecessor application variant.

20. The method of claim 19, wherein executing the instructions further causes the device to transmit the updated block to the application server.

* * * * *